March 16, 1954     G. T. BAKER ET AL     2,672,519
ELECTRICAL SIGNALING SYSTEM
Filed Dec. 8, 1949                                    6 Sheets-Sheet 1

INVENTORS.
GEORGE THOMAS BAKER.
ALAN DAVISON.
BY
Lippincott & Smith
ATTORNEYS.

INVENTORS.
GEORGE THOMAS BAKER.
ALAN DAVISON.
BY
ATTORNEYS.

Fig. 6

INVENTORS.
GEORGE THOMAS BAKER.
ALAN DAVISON.
BY
ATTORNEYS.

Patented Mar. 16, 1954

2,672,519

UNITED STATES PATENT OFFICE 2,672,519

ELECTRICAL SIGNALING SYSTEM

George Thomas Baker, Taplow, Bucks, and Alan Davison, Liverpool, England, assignors to Automatic Telephone & Electric Company Limited, Liverpool, England, a British company Application December 8, 1949, Serial No. 131,748

Claims priority, application Great Britain December 17, 1948

9 Claims. (Cl. 179—18)

The present invention relates to electrical signalling systems and is more particularly concerned with systems in which information is transmitted in coded form.

More specifically, the information is transmitted by the use of marking and spacing signals in the form of a multi-unit code and the main object of the invention is to provide an improved signalling system employing code transmission of this type.

According to this feature of the invention, in an arrangement for transmitting information by the use of marking and spacing signals in the form of a multi-unit code, the control of the transmission of marking and spacing signals is effected at the transmitting point by a relay set controlled by an electronic impulse generator and one or more serially-arranged electronic pulse-halving stages while at the receiving point the marking signals are distributed to the corresponding equipment under the control of one or more serially arranged electronic pulse-halving stages which are operated by the incoming spacing signals.

The invention has particular application to a system of calling line identification known as the "forward marking system" which is disclosed in United States Patent No. 2,292,977 to Reginald Taylor and George Thomas Baker on August 11, 1942 and entitled "Electrical Signalling System."

In this arrangement two leads are connected to each line circuit through non-linear resistors and marking signals are applied successively to one of the leads in accordance with the thousands and tens digits and to the other lead in accordance with the hundreds and units digits. This is effected by multipling the thousands and tens leads of all subscribers having the same thousands and tens digits and similarly for the hundreds and units leads, suitable changeover arrangements being provided to enable marking signals for two digits to be applied to each lead. Using this arrangement any line in a 10,000 line exchange could be identified by applying marking signals to a total of 20 common leads, 10 for the thousands and tens digits and 10 for the hundreds and units digits.

The marking signals are transmitted by using a 2 V. F. (voice frequency) four unit code, one voice frequency being used for marking and the other for spacing. One form of transmitting and receiving arrangement using marking signals of this type is described in United States Patent No. 2,550,181, granted April 24, 1951 to George Thomas Baker upon an invention entitled "Line Identification System." Referring to the first unit of the code as W, the second as X, the third as Y and the fourth as Z, the code combination for the digits 1 to 0 are as follows: 1–W; 2–X; 3–Y; 4–Z; 5–WX; 6–WY; 7–WZ; 8–XY; 9–YZ; 0–XZ. Transmission begins with a spacing signal followed by marking signals or no-signal periods according to the digit being transmitted, the marking signals or no-signal periods being separated by a spacing signal which serves as a synchronising signal at the receiver and serves to control a distributor to ensure that the code units as they are received are registered on the corresponding registering devices.

In the above-mentioned United States Patent No. 2,550,181, the control of signal transmission and the control of the changeover arrangements were effected at the transmitting end by a relay set which included a vibrator controlling a number of relay pulse-halving stages. Such an arrangement is not altogether reliable at the operating speeds required and it is another object of the invention to provide an improved control relay set. A further object of the invention is to provide at the receiver an improved distributor for the incoming signals.

According therefore to another feature of the invention, in a forward marking line identification system employing a 2 V. F. (voice-frequency) multi-unit code for transmitting signals representative of the digits of the line number, a relay set at the transmitting point includes an electronic impulse generator and two serially-arranged electronic pulse-halving stages controlled by said impulse generator, the impulse generator serving to control the transmission of marking and spacing signals while the application of marking signals to the appropriate ones of the common leads for the transmission of the thousands and hundreds digits is effected jointly by the pulse-halving stages and the control of the changeover arrangements for enabling the transmission of the tens and units digits is effected by the second pulse-halving stage.

According to a further feature of the invention, in a forward marking line identification system employing a 2 V. F. multi-unit code for transmitting signals representative of the digits of the line number, two groups of registering devices are provided at the receiving point for successively registering marking signals corresponding to two digits under the joint control of two serially-arranged electronic pulse-halving stages operated by incoming spacing signals, the digit registered on one group being transferred to storage equipment due to the operation of the second pulse-halving stage so that the registering devices are available for receiving in rapid succession more than two digits.

The invention will be better understood from the following description of one embodiment as applied to a calling line identification system taken in conjunction with the accompanying drawings.

It will, however, be understood that the invention is not limited in its use to such a system but may be used in any system wherein a similar method of coded transmission is employed.

In the drawings:

Figs. 4 and 5 together show the transmitting arrangements, Fig. 4 being arranged to the left of Fig. 5, Figs. 6 and 7 show the receiving arrangements, Fig. 6 being arranged above Fig. 7 while

Figure 4:
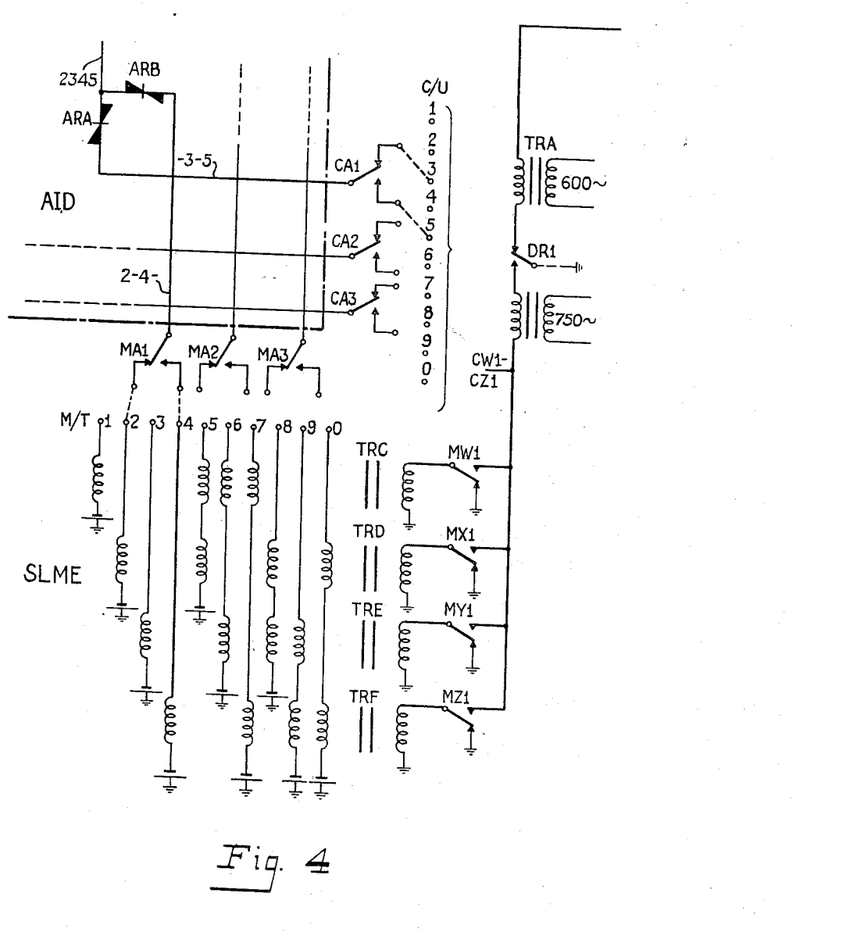
Figure 5:
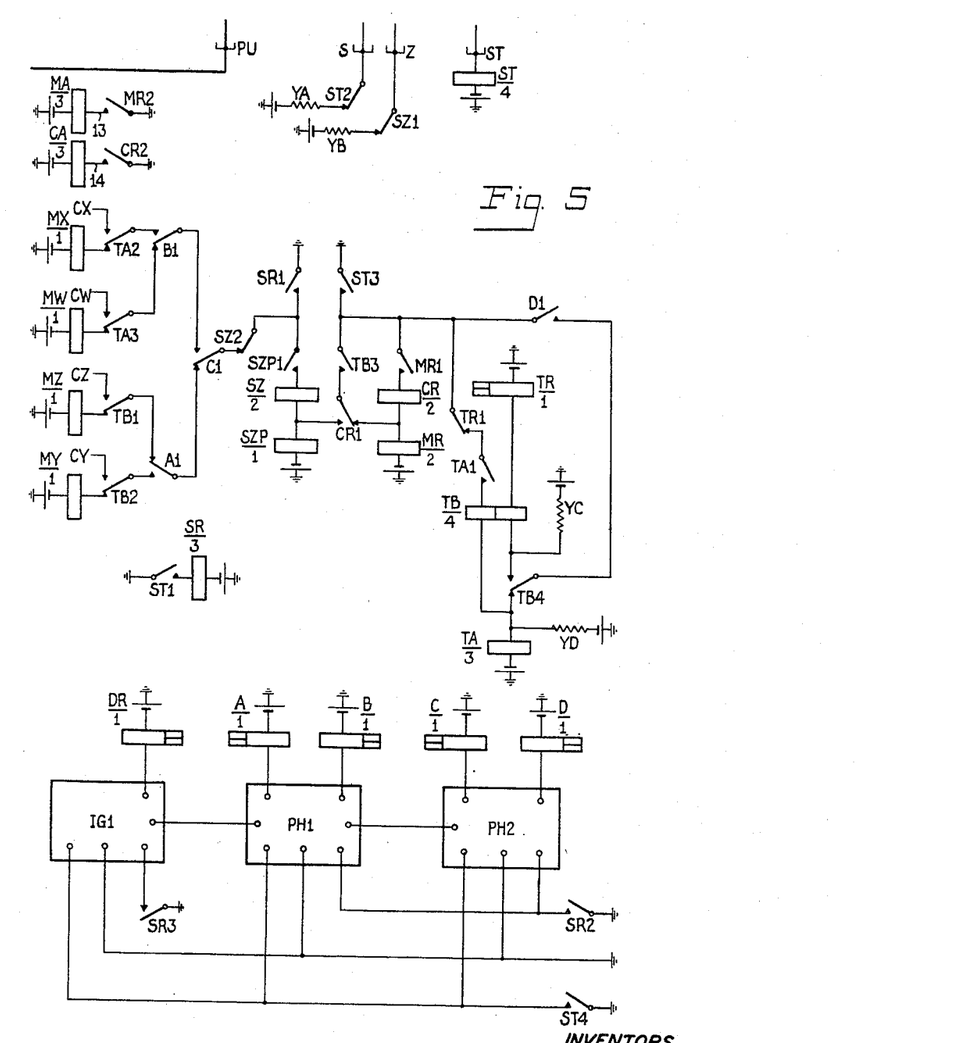
Figure 6:
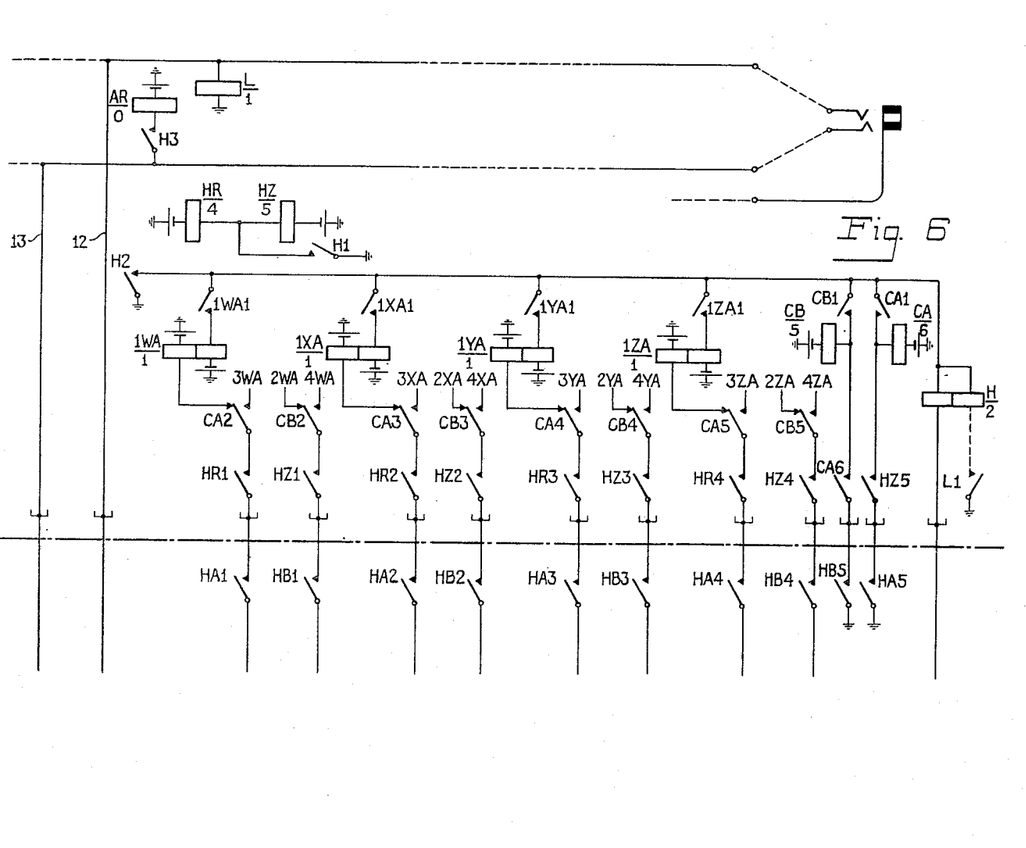
Figure 7:
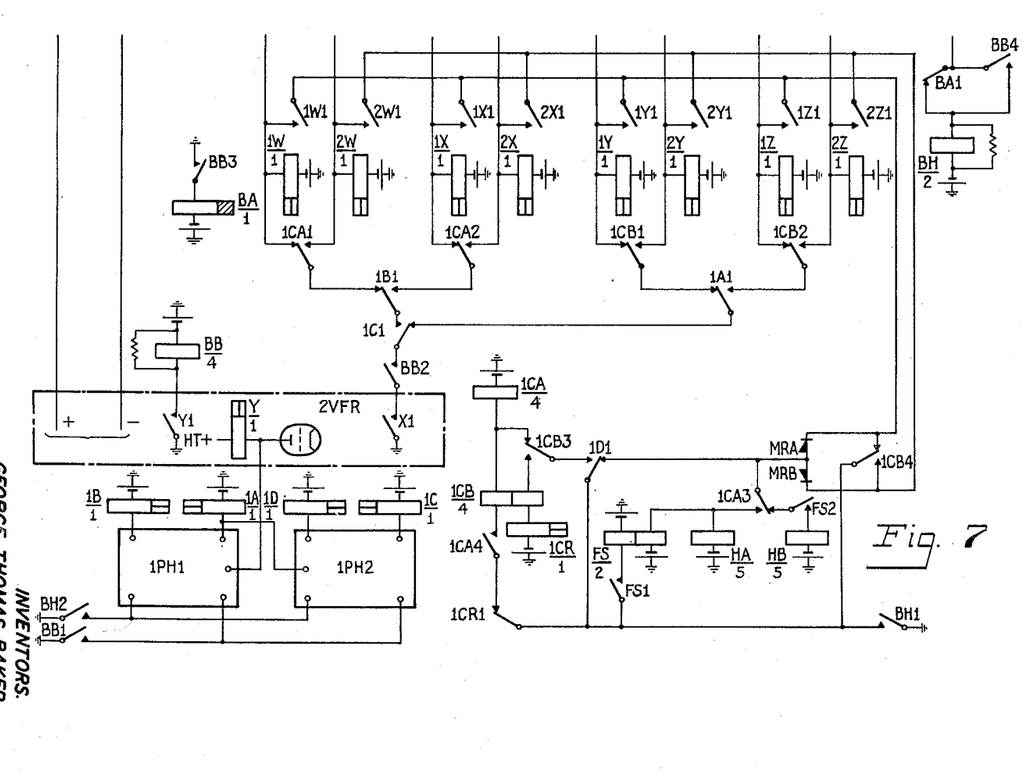

It should be explained that the transmitting and receiving arrangements forming the subject of the present invention have been arranged for incorporation in the complete identification system described in the specification accompanying application No. 739,478 and in fact Fig. 4 of the present specification corresponds exactly with Fig. 4 of the prior specification, Fig. 5 is intended to replace Fig. 5 of the previous application, while Figs. 6 and 7 are intended to replace Fig. 3 of the prior specification.

Figure 2:
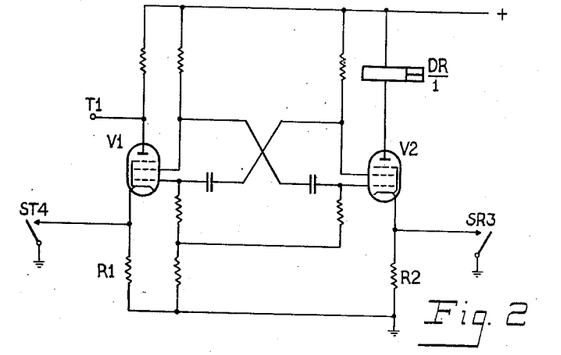
Fig. 2 shows the impulse generator.

A description will first be given of the impulse generator shown in Fig. 2 and it will be seen by reference to this figure that it comprises a multivibrator circuit using the cathode, control grid and screen grid of the pentode valves V1 and V2 while a high speed responding relay is inserted in the anode circuit of the valve V2. When no identification is taking place, neither relays ST nor SR (not shown in Fig. 2) are operated so that contacts ST4 and SR3 are open and the comparatively high resistances R1 and R2 are inserted in the cathode leads of the valves V1 and V2. The effect of these two resistances is to reduce the loop gain of the circuit to less than unity so that oscillation is prevented.

When identification is to take place, relay ST operates first, followed by relay SR. When relay ST operates and resistance R1 is short-circuited the valve V1 conducts heavily and a negative pulse is passed through terminal T1 to the first pulse-halving stage. This pulse is, however, without effect on the pulse-halving stage as will be described later. Since resistance R2 is still in the cathode lead of the valve V2 the circuit does not yet begin to oscillate. When relay SR operates and resistance R2 is short-circuited, valve V2 conducts and the circuit begins to oscillate. Relay DR operates when V2 conducts and at its contacts DR1 (not shown in Fig. 2), transmits the first marking pulse. It will be understood that the sequential operation of relays ST and SR is necessary in order to obtain the proper sequence of operation of relay DR and the relays in the pulse-halving circuit.

Figure 3:
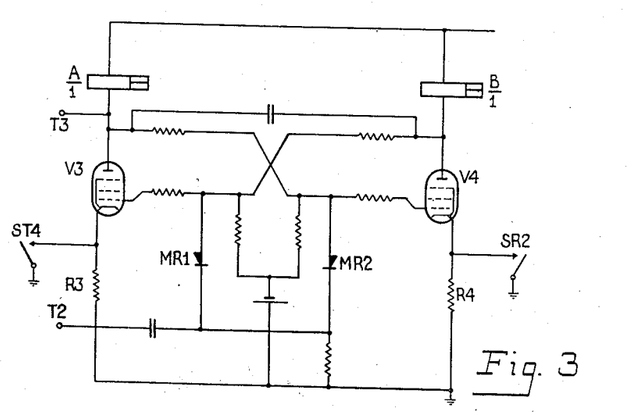
Fig. 3 shows one of the pulse-halving circuits.

All the pulse-halving circuits are identical and the circuit of one of them is shown in Fig. 3. From this circuit it will be seen that the coupling between the two valves is purely resistive and hence the circuit has two stable states of equilibrium. As in the case of the multivibrator of Fig. 2, the cathode lead of each of the valves V3 and V4 includes a comparatively high resistance R3 and R4 respectively and these are short-circuited sequentially in a similar manner to that described for the multivibrator in order that the proper sequence of operation of relays A and B is ensured. Triggering pulses are applied to the circuit from terminal T2 from the impulse generator or the previous-halving circuit or other impulsing arrangement while if the pulse-halving circuit is followed by a further pulse-halving circuit, the latter is triggered by negative-going pulses from terminal T3. The rectifiers MR1 and MR2 are provided to prevent the triggering due to positive-going pulses applied to terminal T2.

When relay ST operates, the valve V3 conducts heavily and tends to cause the operation of relay A. As previously mentioned, however, substantially simultaneously a negative-going pulse is applied via T2 to the control grid of V3 which tends to cut off the valve. This pulse however is of very short duration so that its only effect is to delay the operation of relay A slightly and the relay is fully operated before relay SR operates.

Referring now to Figs. 4 and 5, the impulse generator and pulse-halving stages have been shown schematically in order not to complicate the figure and it will be seen that the impulse generator IG1 is used to drive two pulse-halving stages PH1 and PH2. It will be noted that the same contact ST4 is employed for causing the first changeover of the impulse generator and pulse-halving stages while separate contacts of relay SR are used for the impulse generator and pulse-halving stages. This is to avoid interaction between the generator and pulse halvers which is found to occur if the same SR contact is used for all circuits. The operations which take place when a line is to be identified are be described in detail in the specification of United States Patent No. 2,550,181. Above mentioned, and the effect on the circuit shown in Figs. 4 and 5 is firstly to operate relay ST over the start lead ST and to connect the secondary winding of a transformer to the speaking leads, the primary of the transformer being included in lead PU. Hence immediately a start pulse is received, since relay DR will be in its unoperated condition, it will, at contact DR1 (Fig. 4) transmit a seizing pulse of 600 c./s. over the speaking leads. This pulse serves to condition the receiving equipment for reception in a manner to be described later. Relay ST in operating at contact ST1 completes a circuit for relay SR, at contact ST2 disconnects battery over resistance YA from lead S for the purpose described in the prior specification, at contact ST3 connects up an operating ground for a group of relays and at contact ST4 prepares the impulse generator and pulse-halving stages for operation as described in connection with Figs. 2 and 3. When relay SR operates, at contacts SR2 and SR3 it causes the impulse generator and pulse-halving stages to commence oscillation and the arrangement is such that on the operation of relay SR, relays DR, A and C are operated. The following circuit is therefore closed, ground, SR1, SZ2, C1, B1, TA3, winding of relay MW to battery. Relay MW in operating at armature MW1 (Fig. 4) removes the short-circuit from around the primary winding of transformer TRC and since relay DR is operated, a circuit is completed whereby the primary winding is effectively connected to the secondary winding of transformer TRB over which a 750 c./s. current is fed to transformer TRC. It will be assumed that as shown for Fig. 4, the number of the line to be identified is 2345. In the present case, therefore, since the W position in the first digit 2 is a no-signal position, no 750 c./s. current is transmitted through the marking equipment to the line in the particular example considered.

When the impulse generator changes over the relay DR releases, the 750 c./s. source is disconnected from transformer TRC while the 600 c./s. source is connected to lead PU and a spacing pulse is transmitted over the line to the receiving equipment from transformer TRA. On the next changeover of the impulse generator, relay DR will again operate and cause the first changeover of the pulse-halving circuit PH1. Relay A will, therefore release and relay B will operate so that the circuit to relay MW is opened and the relay releases while a circuit from earth at contact SR1 is now completed for relay MX. Relay MX at contact MX1 connects transformer TRD to the 750 c./s. source and this current is transmitted over the extreme left-hand secondary winding of transformer TRD, M/T terminal 2, MA1, non-linear resistor ARB to the lead extending to the calling line so that a marking pulse is transmitted to the receiving equipment.

In a similar manner to that described above, relays MY and MZ are successively operated in order to connect up transformers TRE and TRF to the 750 c./s. source.

Figure 8:
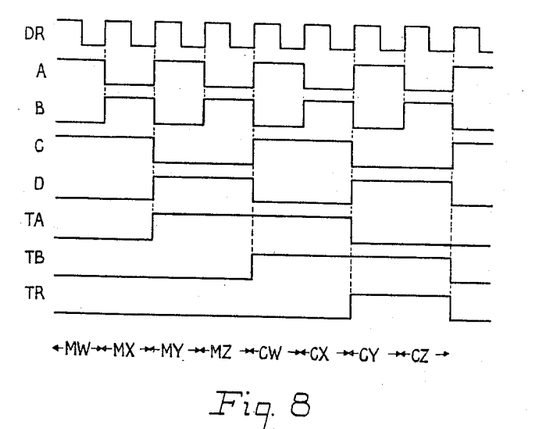
Figs. 8 and 9 show diagrammatically the sequence of relay operations at the transmitting and receiving ends respectively.
Figure 9:
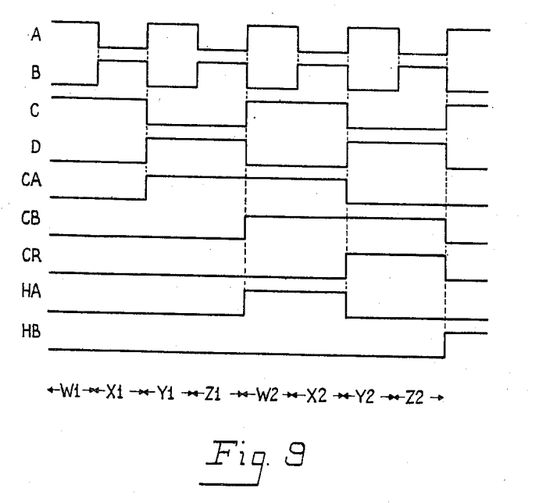

Referring to Fig. 8 it will be seen that the pulse-halving stage PH2 effects its first changeover on the fourth changeover of the impulse generator. Relay C then releases to control the successive operation of relays MY and MZ while relay D operates and at contact D1 extends ground from ST3 over TB4 to the winding of relay TA. Relay TA operates and at contacts TA2 and TA3 prepares for the operation of relays CX and CW (not shown) which relays control the connecting up of transformers similar to TRC and TRD for the transmission of the hundreds digit. Relay TA at contact TA1 prepares a locking circuit for itself independent of relay D, this locking circuit including the left-hand winding of relay TB. The circuit is, however, not effective at this time since contact D1 is closed. When relay D releases on the eighth changeover of the impulse generator, that is to say, when the first digit of the calling line number has been completely transmitted, this circuit becomes effective and relay TA locks in series with relay TB which operates. The transmission of the first two units of the second digit can be effected immediately since relays CX and CW have been operated and when relay TB operates circuits are prepared at TB1 and TB2 for relays CY and CZ so that the third and fourth units of the second digit may be transmitted in their appropriate sequence.

A further result of the operation of relay TB is to complete a circuit for relay MR over contacts CR1 and TB3 to earth at ST3. Relay MR in operating at contacts MR2 closes the circuit for the changeover relay MA which thereby at contacts MA1, MA2 and MA3, switches the leads from one side of the non-linear resistors from the common leads appropriate to the thousands digit to those appropriate to the tens digit in preparation for the transmission of said digit.

When relay D operates a second time at the end of the transmission of the second unit of the second digit, a holding circuit is completed for the right-hand winding of relay TB over D1 and TB4 and an energising circuit is completed over the same contacts for the high speed relay TR. Relay TR at contact TR1 opens the energising circuit for the left-hand winding of relay TB and also the holding circuit for relay TA which thereupon releases and at contacts TA2 and TA3 again connnects relays MX and MW in order to prepare for the transmission of the tens digit. When relay D releases at the end of the transmission of the second digit relays TR and TB both release and relay TB at contacts TB1 and TB2 again connect up relays MZ and MY to control the transmission of the second two units of the third digit. In addition, relay TB in releasing at contact TB3 removes the short circuit from the winding of relay CR which thereupon operates in series with relay MR over contact MR1 to earth at ST3. Relay CR at contacts CR2 completes a circuit for the changeover relay CA which at contacts CA1, CA2 and CA3 changes over the connection of the leads extending to the non-linear resistors so that the units digit may be transmitted.

Another cycle of operations now takes place involving the successive operation of relays MW to MZ and CW to CZ as described above, the sequence relays TA and TB and TR operating in the same manner. It should, however, be noted that since CR is operated at this time when relay TB operates at the end of the transmission of the third digit, a circuit will be completed over CR1 for relay SZP which at contact SZP1 prepares a circuit for the release relay SZ. This circuit is, however, not effective at this time owing to the ground connection over contacts ST3, TB3 and CR1. When relay TB releases at the end of the transmission of the fourth digit however, relay SZ operates in series with relay SZP and at contact SZ1 removes battery via resistor YB from lead Z and at contact SZ2 removes the operating ground from relays MW to MZ and CW to CZ. The removal of resistance battery from lead Z terminates the start condition as described in the above-mentioned specification whereby relay ST releases. Relay ST in releasing at contact ST1 releases relay SR whereupon further operation of the impulse generator and the pulse-having stages is prevented, at contacts ST2 it replaces the idle marking potential on lead S and at contacts ST3 it opens the holding circuit for relays CR and MR which thereupon release. The equipment is now in a condition to identify another calling line.

A description will now be given of the receiving equipment shown in Figs. 6 and 7 and it will be seen by reference to Fig. 7 that two pulse-halving stages, 1PH1 and 1PH2 are used. The incoming signal pulses are fed over leads 12 and 13 to the 2 voice frequency receiver 2VFR in which relay X (not shown) responds to the 750 c./s. current while relay Y responds to the 600 c./s. current. Relay Y is located in the anode circuit of a valve in the voice frequency receiver as shown diagrammatically in Fig. 7 and negative-going pulses are fed from the anode circuit of the valve to trigger the pulse-halving stage 1PH1.

Briefly the circuit operates in the following manner: the first incoming digit is registered on relays 1W, 1X, 1Y and 1Z and the second digit is registered on relays 2W, 2X, 2Y and 2Z. While the second digit is being registered, the first digit is transferred from relays 1W, 1X, 1Y and 1Z to relays 1WA, 1XA, 1YA and 1ZA in storage equipment which is associated with the operator's position equipment. Relays 1W, 1X, 1Y and 1Z thereupon release and the third digit is registered thereon while during this registration the second digit is transferred to relays 2WA, 2XA, 2YA and 2ZA (not shown). Similarly the fourth digit is registered on relays 2W, 2X, 2Y and 2Z while the third digit is being transferred to relays 3WA, 3XA, 3YA and 3ZA. Finally the fourth digit is transferred to relays 4WA, 4XA, 4YA and 4ZA. Thus the two groups of registering relays are used twice over to register the four digits and each digit is transferred to the appropriate group of storage relays while the next digit is being registered.

Figure 1:
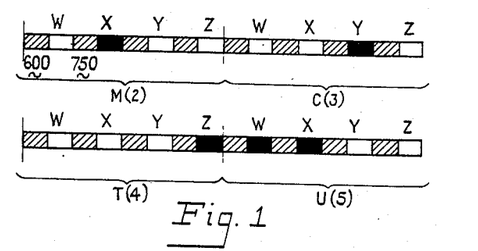
Fig. 1 shows schematically the form of the signals transmitted for a particular number of the calling line.

A detailed description will now be given of the circuit operations involved. When the circuit shown in Figs. 6 and 7 is taken into use by the operator inserting a plug in the jack relay L operates and completes a circuit at contacts L1 over both windings of relay H in series, contact BA1 (Fig. 7), winding of relay BH to battery. Assuming that common equipment comprising the receiver and registering relays is idle, relay H will operate and lock over contacts H2 and its low resistance right-hand winding thereby marking the common equipment as busy. Relay BH in operating at contacts BH2 causes one of the valves in each of the pulse-halving circuits to conduct as described with reference to Fig. 3. The first pulse to be received will be the 600 c./s. seizing signal which will cause the operation of relay Y which at Y1 completes a circuit for relay BB. Relay BB is arranged to be slow-to-release and holds for the duration of the signal transmission. At contacts BB1 relay BB causes both pulse-halving stages to be conditioned for operation, at BB2 it prepares a point in the circuit extending to the registering relays, at BB3 it operates the slow-to-release relay BA and at BB4 it closes the alternative circuit for relay BH, the operation of relay BA opening the original circuit for relay BH. At the end of the transmission of the seizing pulse, the condition of the pulse-halving stages is such that relays 1A and 1C are operated. Referring to Fig. 1 it will be seen that in the present case the first unit of the first digit is a no-signal unit and hence there will be no operation of relay X. The succeeding spacing pulse will cause the operation of relay Y and the transmission of a negative-going pulse to the pulse-halving stage 1PH1 whereby relay 1A will release and 1B operate to connect up registering relay 1X instead of relay 1W. The second unit of the first digit is a signal unit and hence relay X will operate to cause the operation of relay 1X over the circuit earth, contacts X1, BB2, 1C1, 1B1, 1CA2, winding of relay 1X to battery. Relay 1X thereupon operates and locks over 1X1 and 1CB4 to earth at contacts BH1. The successive connecting up of relays 1W, 1X, 1Y and 1Z in response to the reception of the 600 c./s. spacing signals will be readily appreciated from the description given above in connection with relays MW, MX, MY and MZ and the transmitting equipment.

On the first operation of relay 1D at the end of the reception of the second unit of the first digit, a circuit is completed from earth at BH1, through 1D1 and 1CB3 for relay CA which operates and at contacts 1CA1 and 1CA2 connects up relays 2W and 2X in preparation for the reception of the first two units of the second digit while at 1CA3 relay 1CA prepares a circuit for energising the right-hand winding of relay FS and the winding of relay HA in parallel. These relays do not, however, operate at this time since the circuit over contacts 1CB4 and BH1 is blocked, first by rectifier MRA and subsequently when relay 1CB has operated by rectifier MRB. When relay 1D releases at the end of the reception of the fourth unit of the first digit, a locking circuit for relay 1CA becomes effective, which locking circuit includes the left-hand winding of relay 1CB. This circuit was not previously effective due to the short circuiting effect of relay 1D. Relay 1CB in operating at contacts 1CB1 and 1CB2 disconnects relays 1Y and 1Z on which the 3rd and 4th units of the first digit are registered and connects up relays 2Y and 2Z in preparation for the registration of the 3rd and 4th units of the second digit. Relay 1CB also at contacts 1CB4 opens the original locking circuit of relays 1W, 1X, 1Y and 1Z, but these relays are maintained by contact 1D1 until the end of the reception of the first two units of the second digit when relay 1D again operates and relays 1W, 1X, 1Y and 1Z release.

Also when relay 1D releases at the end of the reception of the fourth unit of the first digit, relays HA and FS operate in parallel. Relay FS locks over its left-hand winding and contact FS1 and at contacts FS2 prepares a circuit for relay HB. Relay 1HA in operating at contacts 1HA1 to 1HA4 extends the locking circuits of registering relays 1W, 1X, 1Y and 1Z to storage relays 1WA, 1XA, 1YA and 1ZA in the position equipment so that the corresponding ones of the storage relays operate and lock to earth at contacts H2. The first digit is thus transferred to the storage relays. In addition relay 1HA at contacts 1HA5 completes a circuit for relay CA which operates and locks over CA1 to earth at H2 and at CA2 to CA5 disconnects relays 1WA to 1ZA and connects up relays 3WA to 3ZA (not shown) in readiness for the transfer of the third digit. Relay CA at CA6 also prepares a circuit for relay CB.

On the next operation of relay 1D at the end of the reception of the second unit of the second digit, a circuit is completed from earth at BH1, 1D1, 1CB3, right-hand winding of relay 1CB, winding of relay 1CR to battery. Relay 1CB holds in this circuit and relay 1CR operates and at contacts 1CR1 opens the circuit for relay 1CA which releases. Relay 1CA in releasing at contacts 1CA1 and 1CA2 disconnects relays 2W and 2X and connects up relays 1W and 1X in preparation for the rereception of the first two units of the third digit while at contacts 1CA3, relay 1CA opens the circuit to relay HA and prepares a circuit for relay HB. Relay HA in releasing disconnects the locking circuits for relays 1W to 1Z from the windings of relays 1WA to 1ZA.

On the next release of relay 1D at the end of the reception of the 4th unit of the 2nd digit, relay HB operates to enable the second digit to be transferred to relays 2WA to 2ZA at contacts HB1 to HB4 while at contacts HB5 a circuit is completed for relay CB which operates and locks over CB1 and at contacts CB2 to CB4 disconnects relays 2WA to 2ZA, to which the second digit has now been transferred, and connects up relays 4WA to 4ZA in readiness for the transfer of the 4th digit.

The reception and transfer of the third and fourth digits takes place in a similar manner as that described for the first and second digits, with the difference that relays CA and CB are operated so that the third digit is registered on relays 1W to 1Z and transferred to relays 3WA to 3ZA while the fourth digit is registered on relays 2W to 2Z and transferred to relays 4WA to 4ZA. Relay BB releases shortly after the reception of the 4th unit of the 4th digit since this is not followed by a spacing pulse and at BB4 opens the circuit of relay BH and the original circuit of relay H; at BB2 opens the circuit to the registering relays; at BB1 inserts the cathode resistance in the circuit of the V2 valves in the pulse halving stages and at BB3 opens the circuit of relay BA. The release time of relay BA is sufficient to ensure that contact BA1 does not close until relays H and BH are fully de-energised. The closing of contact BA1 renders the receiving equipment available to another position equipment.

Relay H remains operated until the operator withdraws the plug from the jack at the end of conversation whereupon relay L releases followed by relay H which at H2 opens the locking circuits of all the storage relays which release and the equipment is in a condition to deal with another call.

It will be understood that while the invention has been described with reference to a four digit transmission, it is not limited thereto and the circuits may be readily adapted by those skilled in the art for the transmission or reception of a lesser or greater number of digits. Further the particular circuits of the impulse generator and the pulse-halving circuits need not be identical with those shown in Figs. 2 and 3 respectively but any circuits may be used which are capable of operating in the manner described.

We claim:

1. An electrical signalling system for transmitting information in the form of a multi-unit code comprising a line, transmitting apparatus connecting to said line at one point, receiving apparatus connecting to said line at another point, an electronic impulse generator in said transmitting apparatus for causing the timed transmission of spacing signals over said line to said receiving apparatus, at least one electronic pulse-halving stage in said transmitting apparatus controlled by said electronic impulse generator, a relay set in said transmitting apparatus controlled by said pulse-halving stage to cause the transmission of marking signals in the intervals between spacing signals, means in said receiving apparatus for responding to said spacing signals, at least one electronic pulse-halving stage in said receiving apparatus responsive to the operation of said spacing signal responding means, means in said receiving apparatus for responding to said marking signals, a plurality of register devices in said receiving apparatus, and means responsive to the operation of said pulse-halving stage in the receiving apparatus for connecting up said register devices successively for operation by said marking signal responding means.

2. An electrical signalling system as claimed in claim 1 wherein said electronic impulse generator comprises a multivibrator circuit, and wherein said transmitter and receiver pulse-halving circuits comprise a two-tube resistive cross-coupled circuit having two states of stable equilibrium.

3. An electrical signalling system as claimed in claim 2 wherein the cathode lead of each of the tubes of the pulse-halving circuits includes a high-valued resistor to prevent the operation of the circuits in the quiescent condition of the system.

4. An electrical signalling system as claimed in claim 3 wherein means are provided for disconnecting said resistors sequentially when the system becomes operative in order to insure the appropriate starting conditions for said circuits.

5. In a forward-marking line identification system having a plurality of subscriber stations and employing a two-voice-frequency multi-unit code for transmitting signals representative of the digits of the line number, said signals consisting of spacing signals the duration between which defines an interval representing a code element, a transmitting arrangement comprising an electronic impulse generator, two serially-arranged electronic pulse-halving circuits controlled by said impulse generator, two groups of leads common to all subscribers' lines, a first source of voice-frequency current developing a first frequency, a second source of voice-frequency current developing a second frequency, means controlled by said electronic impulse generator for intermittently connecting said first source to said leads to cause the timed transmission of one of said signals, means controlled by said first pulse-halving stage and cooperating with said pulse controlled means for enabling said second source to be connected intermittently to the appropriate ones of the leads in said two common groups and changeover means controlled by said second pulse-halving stage for connecting said second source to the appropriate ones of the lead of said two common groups alternately.

6. A signalling system as claimed in claim 1 wherein said electronic impulse generator comprises a multivibrator circuit, and wherein said transmitter and receiver pulse-halving circuits comprise a two-tube resistive cross-coupled circuit having two states of stable equilibrium, and wherein the means controlled by said electronic high speed generator comprise a high speed relay having a changeover contact which in one position connects up said first source and in the other position connects up said second source.

7. In a forward-marking line identification system employing a two-voice-frequency multi-unit code for transmitting signals representative of the digits of the line number, said signals consisting of spacing signals the duration between which defines an interval representing a code element, a receiving arrangement comprising two serially-arranged pulse-halving stages of which the first responds to the incoming spacing signals, two groups of registering devices, means controlled jointly by said pulse-halving stages for directing incoming marking signals received during code elements to one of the registering devices of the groups, means controlled by said second pulse-halving stage for directing incoming marking signals representative of one digit to one only of said two groups of registering devices, storage means for each digit and means controlled by said second pulse-halving stage for transferring the digit registered on one group of registering devices to the storage means for such digit while the succeeding digit is being registered on the second group of registering devices.

8. A receiving arrangement as claimed in claim 7 wherein said registering devices and said storage means both comprise high speed relays.

9. An electrical signalling system for use between a plurality of subscriber's points and a central point and having a two-voice-frequency multi-unit code for transmitting signals representative of the digits of a calling number and wherein the signals consist of spacing signals the duration between which defines an interval representing a code alinement, a transmitting arrangement comprising an electronic impulse generator, two series-connected pulse-dividing circuits controlled by said impulse generator, two groups of leads common to all subscribers' lines, a pair of generators for generating two different currents of voice frequencies, means controlled by the impulse generator for connecting one of the sources of voice frequency current to said line to cause the time dimension of signals, means controlled by the first of said pulse-dividing stages to connect the second voice frequency source to appropriate ones of the said leads and to said common groups and a changeover circuit control by the second pulse-dividing stage for connecting the second source to appropriate ones of the lead of said two common groups alternately.

GEORGE THOMAS BAKER.
ALAN DAVISON.

References Cited in the file of this patent

UNITED STATES PATENTS

| Number | Name | Date |
| --- | --- | --- |
| 2,068,711 | Robinson et al. | Jan. 26, 1937 |
| 2,096,954 | Bellamy et al. | Oct. 26, 1937 |
| 2,159,107 | Robinson | May 23, 1939 |